Figure 1:
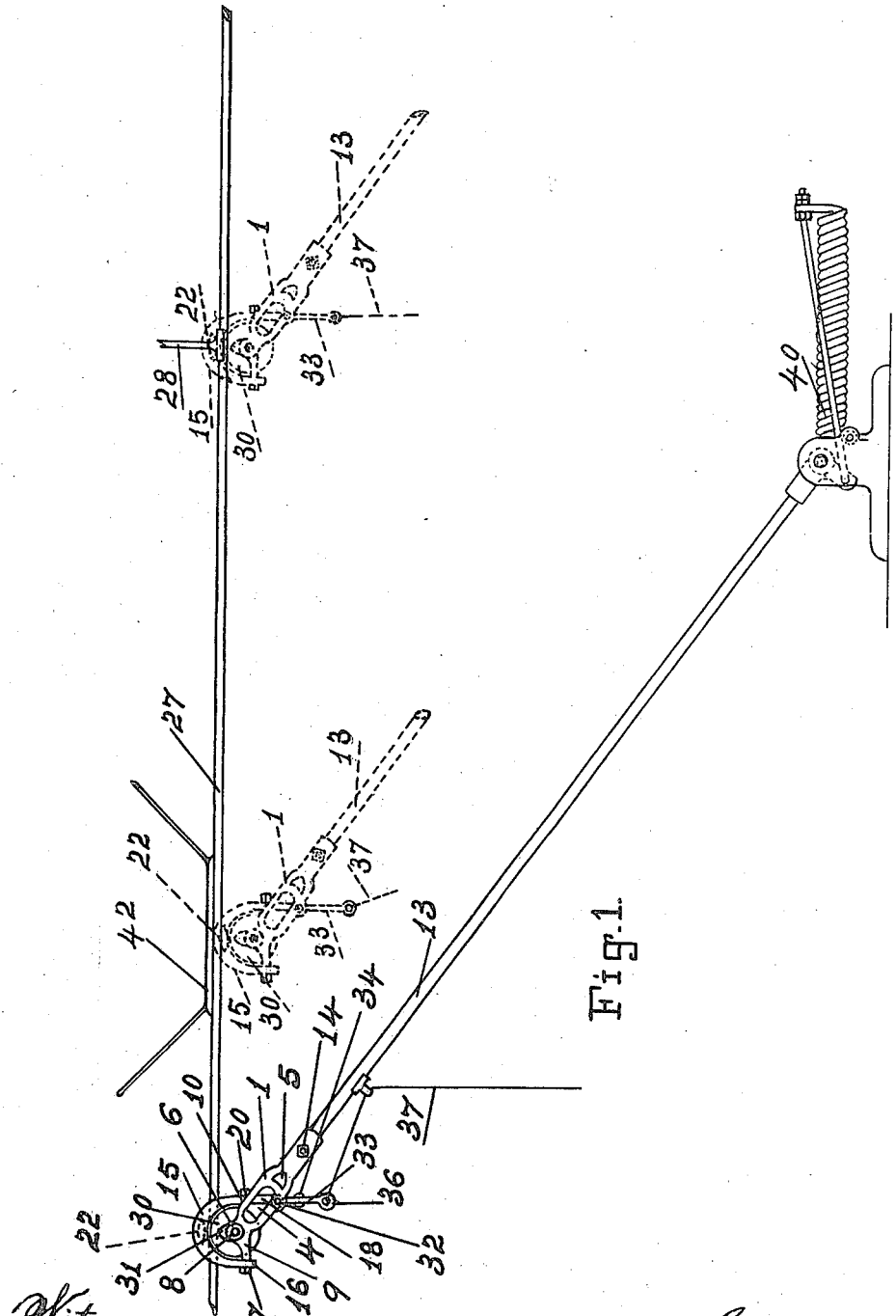

J. A. BOOTH.
TROLLEY.
APPLICATION FILED APR. 24, 1916.

1,240,814.

Patented Sept. 25, 1917.
2 SHEETS—SHEET 1.

Witnesses.
G. H. Miller
Robert A. Bullard.

Inventor.
JAMES A. BOOTH.
by Atty N. DuBois

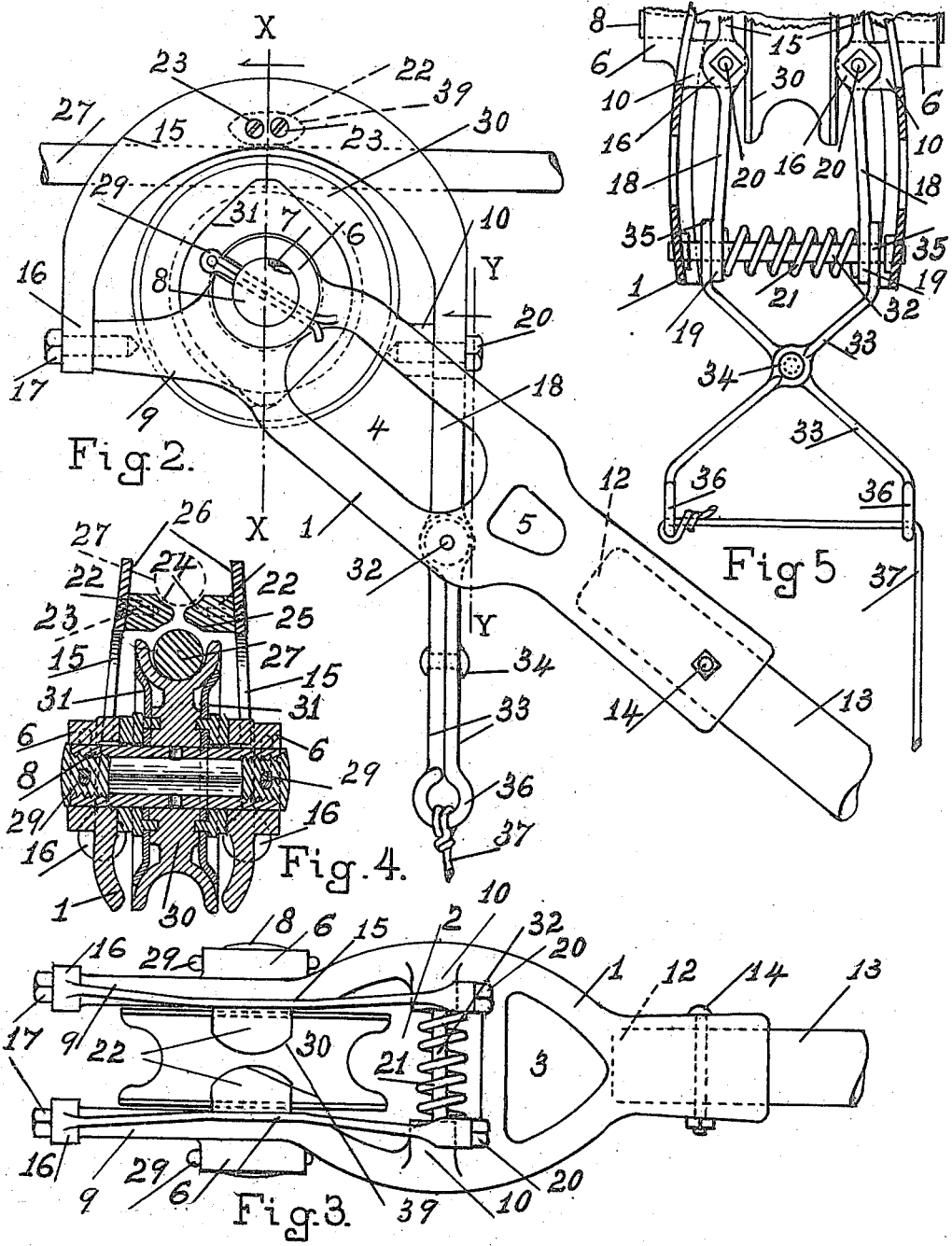

UNITED STATES PATENT OFFICE.

JAMES A. BOOTH, OF SPRINGFIELD, ILLINOIS.

TROLLEY.

1,240,814.  Specification of Letters Patent.  Patented Sept. 25, 1917.

Application filed April 24, 1916. Serial No. 93,196.

*To all whom it may concern:*

Be it known that I, JAMES A. BOOTH, a citizen of the United States, residing at Springfield, in the county of Sangamon and State of Illinois, have invented a new and useful Trolley, of which the following is a specification.

The invention relates to trolleys such as are used on electric railway lines.

The purposes of the invention are:—to provide a trolley harp of improved construction; to provide in conjunction with the harp means whereby the trolley may be automatically depressed while passing under switch plates on the trolley wire, said automatic trolley depressing means being also adapted to maintain the electrical contact of the wire with the trolley while the trolley is in its depressed position and the trolley wheel is disengaged from the line wire, and also adapted to prevent lateral displacement of the trolley relative to the line wire while the trolley is depressed and traveling under the bottom of the switch plate and also adapted to run in contact with the upper surface of the wire, or in contact with the under surface of the wire, as the case may be, and also adapted to break up and remove ice from either the upper surface or the lower surface of the trolley wire; to provide improved means to facilitate the placing of the harp on the trolley wire and to facilitate the removal of the harp from the trolley wire; and to provide other new and useful details of construction.

The invention is illustrated in the annexed drawings to which reference is hereby made, and will be hereinafter described and finally recited in the claims.

Figure 1.—is a side elevation of a trolley embodying my invention; Figs. 2 and 3 are respectively an enlarged side elevation and an enlarged top plan of the trolley-harp and appurtenances; Fig. 4 is a vertical section on the line X. X. of Fig. 2; and Fig. 5 is a vertical section on line Y. Y. of Fig. 2.

Similar reference numerals designate the same parts in the different views.

The harp 1 is a hollow casting of approximately ellipsoidal form, having openings 2, 3, 4 and 5, which lighten the casting and give it a neat and attractive appearance without unduly impairing its strength. At the upper end of each branch of the harp is a hub 6 having a central hole 7 adapted to accommodate the axle 8. The lower member of each branch of the harp has a rearwardly extending, approximately horizontal, integral bracket 9; and the upper member of each branch of the harp has an integral forwardly extending lug 10 in line with the bracket 9 on the same branch of the harp. The brackets 9 and the lugs 10 are a considerable distance below the axis of the axle 8 to admit of the use of guards 15 having curved upper edges adapted to engage on the under surface of the switch plates to depress the trolley so that the upper edges of the guards will slide on the under surface of the switch plates while the trolley is passing under them. The harp 1 has a socket 12. The trolley pole 13 fits in the socket 12 and is secured therein by a bolt 14.

There are two laterally curved arched guards 15, one on each side of the trolley wheel. Each guard has a downwardly extending hinge-member 16. Bolts 17 pivotally connect the members 16 with the brackets 9 respectively. Each guard has a downwardly extending arm 18, having a fork 19 at its lower end. Bolts 20 pivotally connect the arms 18 with the lugs 10. The upper central parts of the guards 15 are approximately parallel to each other as shown in Fig. 3, and when the guards are in their closed position their parallel upper central parts will traverse the trough of the switch pan 42 while the trolley is passing under the switch pan and will prevent lateral displacement of the trolley. The lower parts of the guards are spread laterally so that the hinge-members of the guards are separated from each other by a space greater than the space between the upper central parts of the guards, which are called the cheeks. The form of the guards is such that when the parts are assembled, the upper central parts of the guards will be close to the periphery of the trolley wheel and parallel to its edges, and the downwardly extending arms 18 will be spaced apart from each other a distance sufficient to accommodate a spring 21 which acts on the arms to normally keep the upper central parts of the guards above and parallel to the edges of the trolley wheel.

The axle 8 is secured in the hubs 6 by cotter pins 29.

The trolley wheel 30 rotates on the axle 8. Contact springs 31 are in contact with the faces of the wheel 30 and are electrically connected with the motor by any suitable means, not shown.

A bolt 32 transverse to the harp extends through the forks 19 of the arms 18.

Tongs-levers 33 are connected by a pivot 34. Eyes 35 at the upper ends of the levers 33 support the levers on the bolt 32, the eyes 35 being in contact with the outside of the forks 19 respectively. There are eyes 36 at the lower ends of the levers 33.

The retriever cord 37 is connected with the eye 36 of one lever 33 and extends through the eye 36 of the other lever 33, and extends downwardly within reach of the operator. The spring 21 acts against the fork members 19 of the arms 18 to spread the arms apart to normally keep the lugs 22 of the guards 15 close to each other. The concave upper surfaces 24 of the contact lugs 22 are conformed to the under surface of the trolley wire and slide in electrical contact therewith while the trolley is moving under the switch plates 42. The lugs 22 have rounded ends 39 adapted to engage on the stems of the hangers 28 to spread the guards 15 laterally apart to pass the hangers. The cheeks 26 of the guards 15 prevent lateral displacement of the guards relative to the trolley wire. The spring 21, acting on the arms 18, is strong enough to keep the guards 15 in proper relation to each other to crush ice on the trolley wire, but is adapted to yield under the greater stress of the lifting spring 40, so that the lifting spring will act to raise the trolley after it has been depressed by reason of the curved upper edges of the guards 15 sliding on the under side of the switch plates 42. The upward movement of the trolley after it passes under the switch plate causes the lugs 22 to press against the wire with sufficient force to separate the lugs so that upon continued upward movement of the trolley the lugs will pass the wire and the wheel 30 will engage on the under side of the wire.

In like manner downward movement of the trolley, effected by the edges of the arched guards 15 engaging on the edge of the switch-plate, will cause the curved lower surfaces 25 of the lugs 22 to engage on the upper surface of the line wire and spread the guards apart so that the downwardly moving lugs will pass the line wire.

The operation is as follows:

When the trolley moving along the trolley wire comes to a hanger 28, the rounded ends 39 of the lugs 22 will engage on the stem of the hanger and it will act on the lugs to spread the guards 15 so that the lugs will pass the stem of the hanger as indicated by dotted lines in Fig. 1, and thereupon the spring 21 will act to cause the guards to move inward and return the lugs to their initial position; and so on for each hanger in succession.

When the trolley moving along the trolley wire comes to a switch 42, the upper edges of the guards 15 will engage on the bottom of the switch plate, with the result that as the trolley progresses along the underside of the switch plate the trolley will be pressed vertically downward relative to the trolley wire sufficiently to cause the lugs 22 to pass the wire and occupy a position below it as indicated by dotted lines in Fig. 1, so that the trolley wire will be between the guards 15 and above and in contact with the lugs 22 and the electrical connection will be from the wire through the lugs and the guards to the harp and thence to the motor, and the cheeks 26 of the guards above the lugs will prevent lateral displacement of the trolley relative to the wire. This is a new and valuable feature of my invention. To the best of my knowledge and belief I am the first to equip a trolley with arched guards adapted to engage on the edges of switch plates to depress the trolley and having parallel central parts adapted to traverse the channels of the switch plates, and provided with opposite lugs adapted to contact with the underside of the line wire while the arched guards are traversing the channels of the switch plates. When the guards have passed the switch plate, the lifting spring 40 will act to cause the trolley to move upward to cause the grooved trolley wheel 30 to run on the under side of the trolley-wire; and so on in succession for each switch that is to be passed.

The lugs 22 are in such relation to the guards 15 and the wheel 30 that when the wire is in the groove of the wheel, the upper surface of the wire will be close to the underside of the lugs, and when the lugs are below the wire, the under surface of the wire will be in contact with the upper surface of the lugs, as shown by dotted lines in Fig. 4. If there be ice on the wire, the pressure of the lugs on the wire, controlled by the spring 21, will be effective to crush the ice and cause it to fall from the wire.

To remove the trolley from the wire it is only necessary to pull downward on the retriever cord 37. The first effect of the downward pull on the cord will be to move the lower members of the levers 33 toward each other to cause the upper members of the levers to press the extremities of the arms 18 toward each other and thereby cause the guards 15 to spread apart from each other so that the lugs 22 may pass the wire, and continued downward pull on the cord will cause the trolley to move downward and be withdrawn from the wire. When the guards 15 are pressed toward each other by the action of the spring 21, so that the lugs 22 are close together, the guards are said to be closed, and when the guards are moved away from each other by the action of the lifting spring 40 the guards are said to be open.

Having fully described my invention, what I claim as new and desire to secure by Letters Patent is:

1. In an appliance of the class described, the combination of a line wire; a switch plate stationary on the line wire; a harp; laterally oscillative arched guards mounted in the harp and adapted to engage the edge of the switch-plate to depress the trolley; contact members opposite to each other on the respective arched guards and having curved lower surfaces adapted to engage on the upper surface of the line wire to spread the arched guards apart upon downward movement of the trolley effected by the edges of the arched guards engaging on the edge of the switch plate and curved upper surfaces adapted to engage the under side of the line wire to spread the guards apart upon upward pressure of the contact members against the under side of the line wire.

2. In an appliance of the class described, in combination with a line wire, a switch plate on the line wire, a harp, and a trolley wheel; arched guards oscillative on the harp and adapted to engage the edge of the switch plate to depress the harp and connected parts, contact members opposite to each other on the arched guards and having curved lower surfaces adapted to engage on the upper surface of the line wire to spread apart the arched guards while the trolley is being moved downward against the line wire, and having curved upper surfaces adapted to engage on the under surface of the line-wire to spread the guards apart while the trolley is being moved upward against the line-wire.

3. In a trolley, the combination of arched guards adapted to engage on the edge of a stationary switch plate to depress the trolley and having opposite contact members with curved upper parts adapted to engage on the line-wire to spread the guards apart during upward movement of the trolley and curved lower parts adapted to engage on the line-wire to spread the guards apart during downward movement of the trolley.

4. In a trolley, the combination of a harp, a trolley wheel in the harp, and guards having arched edges adapted to engage switch plates on a line-wire to depress the trolley and having parallel central parts adapted to traverse the channels of the switch plates.

5. In a trolley, the combination of a harp, a trolley wheel in the harp, guards hinged on the harp and having arched edges adapted to engage switch plates on a line-wire to depress the trolley also having parallel central parts adapted to traverse the channels of the switch plates, and contact members on the guards adapted to engage the line-wire to spread the guards outwardly upon upward movement of the trolley and to spread them outwardly, upon downward movement of the trolley, relative to the line-wire.

In witness whereof I have hereunto signed my name at Springfield, Illinois, this 2nd day of December, 1915.

JAMES A. BOOTH.

Witnesses:
S. ALLYNN TROXELL,
N. DU BOIS.

Copies of this patent may be obtained for five cents each, by addressing the "Commissioner of Patents, Washington, D. C."